United States Patent
Ikeda et al.

(10) Patent No.: US 6,756,156 B2
(45) Date of Patent: Jun. 29, 2004

(54) RECTANGULAR ALKALINE STORAGE BATTERY

(75) Inventors: Yasuhiko Ikeda, Itano-gun (JP); Masao Takee, Itano-gun (JP); Teruhiko Imoto, Itano-gun (JP); Masao Inoue, Tokushima (JP); Tetsuyuki Murata, Naruto (JP); Atsutoshi Ako, Itano-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 331 days.

(21) Appl. No.: 10/083,493

(22) Filed: Feb. 27, 2002

(65) Prior Publication Data

US 2002/0160267 A1 Oct. 31, 2002

(30) Foreign Application Priority Data

Feb. 27, 2001 (JP) .................................. P. 2001-051939

(51) Int. Cl.[7] .............................................. H01M 4/74
(52) U.S. Cl. ...................... 429/241; 429/206; 429/233
(58) Field of Search ................................ 429/241, 233, 429/122, 206

(56) References Cited

U.S. PATENT DOCUMENTS

| | | | | |
|---|---|---|---|---|
| 412,727 A | * | 10/1889 | Carpenter | 429/227 |
| 521,970 A | * | 6/1894 | Barbier | 429/241 |
| 6,103,424 A | * | 8/2000 | Hamamatsu et al. | 429/233 |
| 6,461,769 B1 | * | 10/2002 | Ando et al. | 429/231.95 |
| 2001/0041289 A1 | * | 11/2001 | Hikmet et al. | 429/212 |

FOREIGN PATENT DOCUMENTS

JP          10-312824          11/1998

* cited by examiner

Primary Examiner—John S. Maples
(74) Attorney, Agent, or Firm—Nixon & Vanderhye P.C.

(57) ABSTRACT

In a rectangular alkaline storage battery, the sides of negative cores of negative electrode plates 10, which are disposed at the outermost positions of the group of electrode plates and oppose an outer casing can 40, are exposed. The pore ratios (ratio of total area taken up by pores to area of electrode plate) of the exposed cores must be made lower than those of the other unexposed cores. The pore ratio of the exposed negative core is specified as falling within a range of 10% to 40%. As a result, the negative electrode plates 10 are improved in binding strength, thereby inhibiting exfoliation of an active material. Further, there can be obtained a large rectangular alkaline storage battery which has superior permeability for a gas which would arise in the battery, an improved capacity ratio, and greater volumetric energy density.

8 Claims, 4 Drawing Sheets

RECTANGULAR ALKALINE STORAGE BATTERY

BACKGROUND OF THE INVENTION

The present invention relates to an alkaline storage battery such as a nickel-hydrogen storage battery or a nickel-cadmium storage battery, and more particularly, to a rectangular alkaline storage battery including a rectangular metal casing can having a group of electrode plates sealed therein, wherein positive electrode plates formed from electrode plate cores coated with a positive active material and negative electrode plates formed from electrode plate cores coated with a negative active material are stacked alternately into layers with separators sandwiched therebetween.

In order to increase internal volumetric efficiency of equipment using storage batteries, a rectangular alkaline storage battery has been developed as a replacement for a cylindrical alkaline storage battery having a group of spiral electrodes into which positive and negative electrode plates are coiled spirally with separators sandwiched therebetween. In this type of rectangular alkaline storage battery, a group of electrode plates—into which positive and negative electrode plates are alternately stacked with separators sandwiched therebetween—are inserted into a rectangular metal casing can. Positive leads projecting from the positive electrode plates are connected to a positive terminal, and negative leads projecting from the negative electrode plates are connected to a negative terminal. Subsequently, an electrolyte is poured into the metal casing can, and an opening section is sealed with a sealing member.

Demand has rapidly increased for a rectangular alkaline storage battery of this type to serve as a power source for portable equipment such as a notebook computer. In association with an increase in demand, there has arisen a desire for a rectangular alkaline storage battery having greater capacity and longer life. To this end, as described in, e.g., JP-A-10-312824, a rectangular alkaline storage battery of this type has been manufactured through the following processes. Namely, two negative electrode plates are formed, in the right-side and left-side portions of a common strip-shaped core, respectively. The center of the core (i.e., a joint) is bent into a U-shaped form. A positive electrode plate is interposed between the two negative electrode plates that have been bent into a U-shaped form, with a separator sandwiched between the positive electrode plate and each of the negative electrode plates, thereby constituting a electrode plate unit. Positive electrode plates are interposed between electrode plate units with separators sandwiched therebetween, thus constituting a group of electrode plates. The group of electrode plates are inserted into the rectangular casing can along with an electrolyte, thus manufacturing a rectangular alkaline storage battery.

In a rectangular alkaline storage battery described in JP-A-10-312824, active material is eliminated from the sides of cores of the electrode plates which are provided at the outermost positions of a group of electrode plates and brought into contact with the casing can, thus uncovering the cores of the electrode plates disposed at the outermost positions of the group of electrode plates. The group of electrode plates can be inserted into the rectangular casing can without involvement of exfoliation of active material, even though the group of electrode plates are not covered with a metal cover. Consequently, although volumetric energy density can be improved by only the amount corresponding to an omitted metal cover, exfoliation of active material from the electrode plates disposed at the outermost positions of a group of electrode plates can be prevented when the electrode plates are inserted into the casing can.

However, if an attempt is made to uncover the core of the electrode plate by means of removing active material from the sides of the electrode plates disposed at the outermost positions of the group of electrode plates, which sides are to be brought into contact with the casing can, the binding strength of an active material layer applied over the side of the electrode plate opposite to the exposed side thereof is lowered. For this reason, there arises a problem of an active material layer being exfoliated from the side of the electrode plate opposite to the core-exposed side thereof through repeated recharging and discharging operations. Punching metal formed by opening a plurality of pores in a metal electrode plate is usually used for a electrode plate core. However, the binding force which binds the active material layer applied over the punching metal directly to the punching metal is weak. Hence, active materials applied over the respective sides of the punching metal are bound together. If an active material layer applied over one side of punching metal is removed, the binding strength of the active material layer remaining on the other side of the punching metal becomes weaker, with the result that the active material layer located on that side falls from the electrode plate.

SUMMARY OF THE INVENTION

The present invention has been conceived to solve the problem set forth and is aimed at providing a rectangular alkaline storage battery which inhibits exfoliation of an active material so as to maintain the binding strength of an active material layer remaining on the sides of the electrode plates located at the outermost positions of a group of electrode plates, the sides being opposite the core-exposed sides thereof.

To this end, the present invention provides a rectangular alkaline storage battery constituted by means of hermetically sealing, in a rectangular metal casing can, a group of electrode plates in which positive electrode plates formed from electrode plate cores coated with positive active material and negative electrode plates formed from electrode plates cores coated with negative active material are alternately stacked with separators sandwiched therebetween, wherein each of the electrode plate cores has a plurality of pores; outer sides of electrode plate cores disposed at the outermost positions of the group of electrode plates are exposed; and the pore ratio of the electrode plate cores disposed at the outermost positions are 10 to 40%. Preferably, the pores formed in the electrode plate cores disposed at the outermost positions account for a percent area of the electrode plate cores (hereinafter such a percent is called a "pore ratio") are lower than the pore ratio of respective electrode plate cores disposed inside of the outermost positions.

Here, in relation to the core of a electrode plate whose both sides are coated with active material, as pore ratio becomes greater, the permeability of gas evolved in a battery is improved. Moreover, the binding strength of active material provided on either side of each electrode plate core is also improved. Hence, one can safely say that pore ratio is to be increased to the extent that no drop arises in the strength of the electrode plate core.

However, in relation to the electrode plate core for which the applied active material layer is to be removed from one side thereof, as the pore ratio increases, gas permeability is improved. In contrast, the binding strength existing between active material and the electrode plate core drops, and active material falls from the electrode plates in association with discharging and recharging action. In relation to a electrode plate core in which the applied active material is to be removed from one side thereof, the lower the pore ratio, the greater the binding strength existing between the active material and the electrode plate core. In contrast, gas permeability drops.

For these reasons, the pore ratio of an exposed electrode plate core must be made lower than that of another unexposed electrode plate core. Also, the maximum and minimum pore ratios must be optimized. Various tests which have been performed show that a pore ratio of the exposed core of 10% or more inhibits deterioration of battery capacity, which would otherwise be caused in association with a decrease in electrolyte, without involvement of a drop in gas permeability. Further, it is also found that a pore ratio of the exposed electrode plate core of 40% or less improves gas permeability without involvement of a drop in the binding strength existing between active material and the electrode plate core.

When the pore ratio of a electrode plate core is less than 10%, the binding strength existing between the active material and the electrode plate core is increased. However, the permeability of the gas developing in the battery drops. In association with an increase in internal pressure during discharging and recharging cycles, the outer casing can expands, thus lowering the coverage of electrolyte to thereby deteriorate the battery capacity. In contrast, if the pore ratio of the electrode plate core exceeds 40%, the binding strength existing between the active material and the electrode plate core drops, with the result that the active material drops from the electrode plate in association with discharging and recharging operations.

In this case, bumps are formed along brims of respective pores formed in one side of each of the electrode plate cores located at the outermost positions of a group of electrode plates. Active material is applied over the side of the electrode plate having the bumps formed therein. If the side of the electrode plate opposite the bump-formed side is exposed, the bumps become buried in the active material layer, thereby enhancing the binding strength existing between the active material layer and the electrode plate core. For this reason, even when the active material layer is removed from one side of each of the electrode plate cores located at the outermost positions of the group of electrode plates, thus uncovering the electrode plate core, exfoliation of the active material layer from the side opposite the thus-exposed side can be inhibited to a much greater extent. If minute bumps are formed on the surfaces of the electrode plate cores located at the outermost positions of the group of electrode plates, excluding the pores formed therein, the minute bumps become buried in a layer of applied active material, thereby greatly enhancing the binding strength existing between the active material layers and the electrode plate cores located at the outermost positions.

When the exposed surface of each of the electrode plate cores located at the outermost positions of the group of electrode plates remains in contact with the interior surface of the rectangular metal casing can, the group of electrode plates can be readily inserted into the rectangular casing can without use of a metal cover and without involvement of exfoliation of active material. As a result, the volumetric energy density of the battery is improved by the amount corresponding to an omitted metal cover, and the efficiency of collecting electricity from the electrode plates located in the outermost positions to the metal casing can is improved. In this case, if the electrode plate core is constituted of punching metal, the electrode plate core of this type can be manufactured readily, because the punching metal can be formed very easily.

A nonporous joint section is formed integrally with each of the electrode plate cores located at the outermost positions of a group of electrode plates. Further, the joint section is formed into a substantially U-shaped form. A electrode plate of the other polarity is held in a substantially U-shaped space defined through bending, with separators sandwiched therebetween. Adoption of such a structure enables easy construction of a group of electrode plates of this type. Further, contact existing between the substantially U-shaped joint section and the interior surface of the bottom of the metal casing can be improved, thereby improving an efficiency of collecting electricity.

DETAILED DESCRIPTION OF THE PREFERRED EMBODIMENTS

Figure 2:
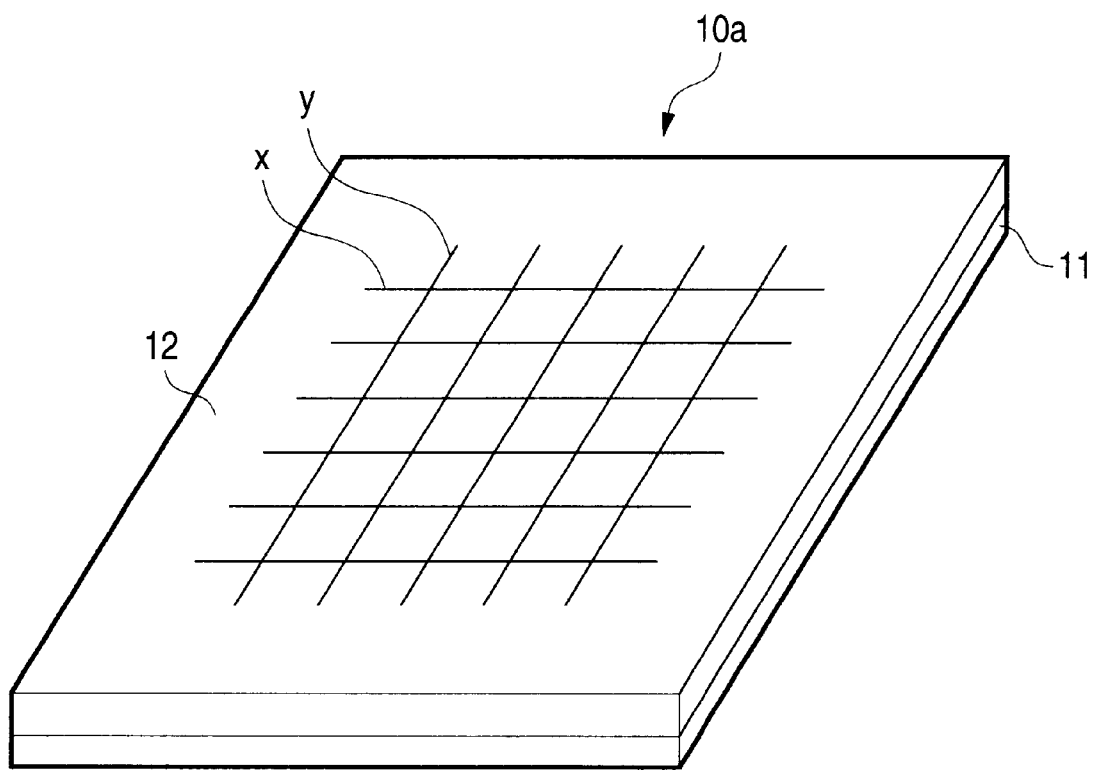
FIG. 2 is a perspective view schematically showing a cross section of a joint section α of a joint negative electrode plate formed from the negative electrode plate core, which is shown in FIGS. 1A through 1D and has a negative active material applied thereto, when the electrode plate is subjected to a strength test.
Figure 3:
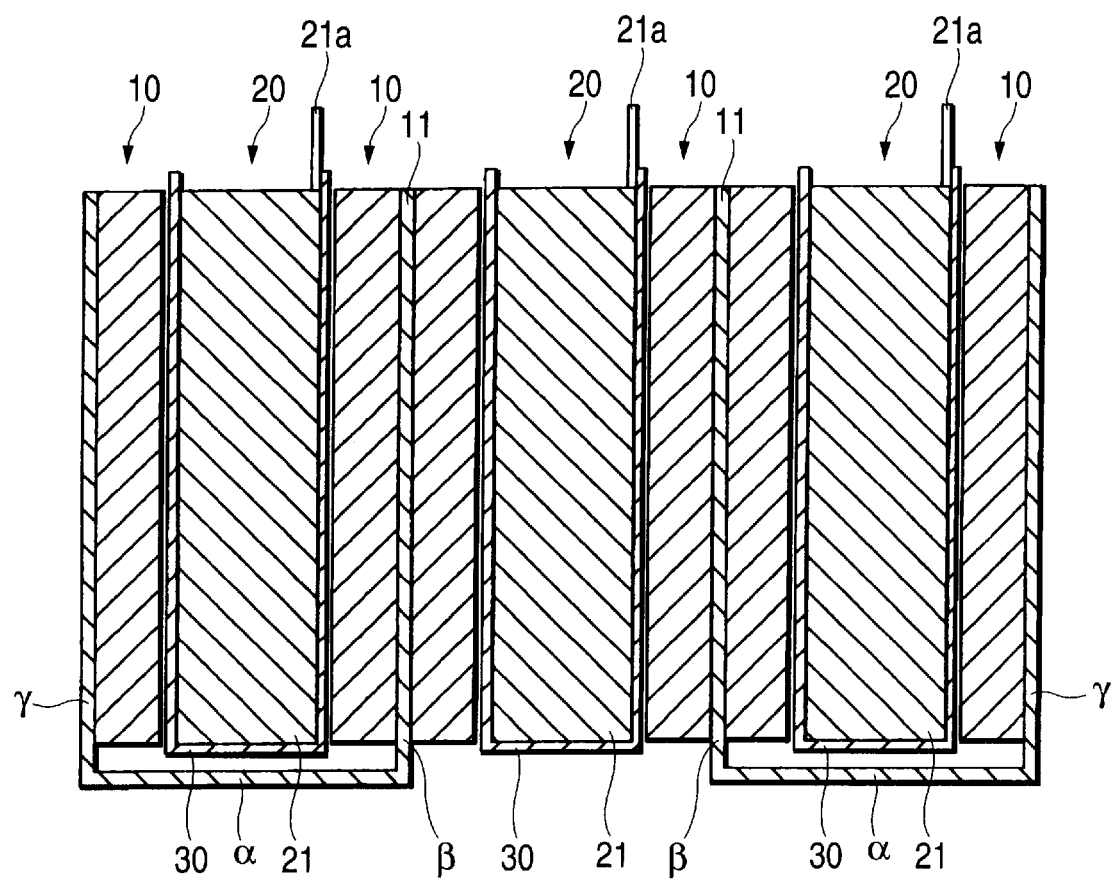
FIG. 3 is a cross section schematically showing a group of electrode plates in which joint negative electrode plates and positive electrode plates are alternately stacked with separators interposed therebetween.
Figure 4:
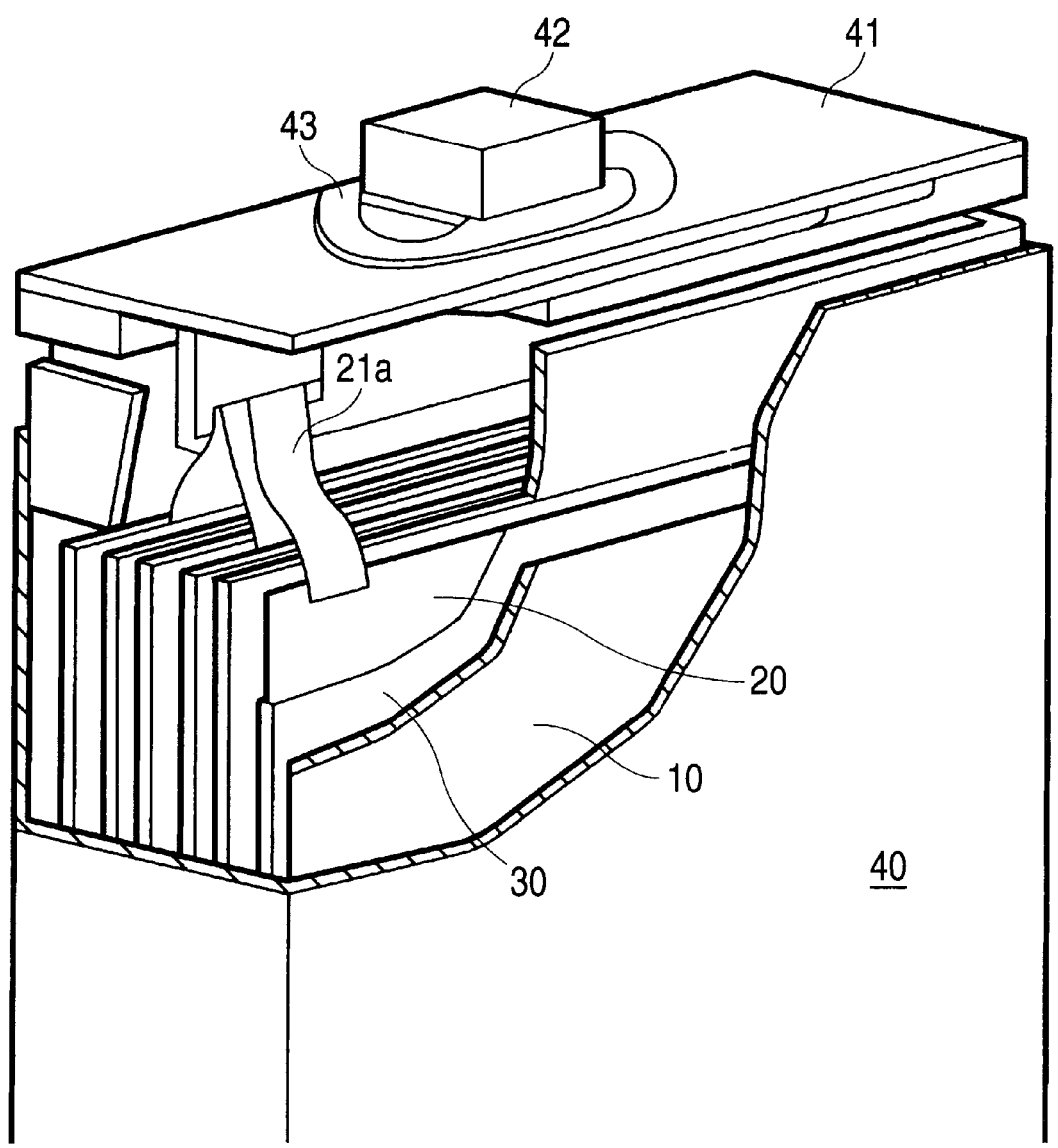
FIG. 4 is a perspective cutaway view schematically showing the principal section of the group of electrode plates shown in FIG. 3 when the electrode plates are housed in a rectangular casing can.

An embodiment in which the present invention is applied to a nickel-hydrogen storage battery will be described by reference to FIGS. 1A through 4. FIGS. 1A through 1D are perspective views schematically showing a core of a negative electrode plate. FIG. 2 is a perspective view schematically showing a cross section of an α section of a joint negative electrode plate formed from the negative electrode plate core, which is shown in FIGS. 1A through 1D and has a negative active material applied thereto, when the electrode plate is subjected to a strength test. FIG. 3 is a cross section schematically showing a group of electrode plates into which joint negative electrode plates and positive electrode plates are alternately stacked with separators interposed therebetween. FIG. 4 is a perspective cutaway view schematically showing the principal section of the group of electrode plates shown in FIG. 3 when the electrode plates are housed in a rectangular casing can.

1. Manufacture of Joint Negative Electrode Plate Core (1) EXAMPLES 1 THROUGH 4

Figure 1A:
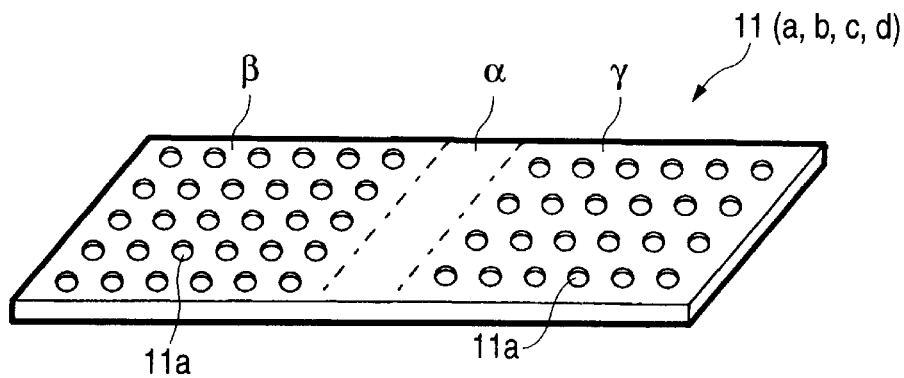
FIGS. 1A-1D are perspective view schematically showing a negative electrode plate core.

As shown in FIG. 1A, a metal electrode plate—which is formed from iron and electrode plated with nickel (to, e.g., a thickness of 0.05 to 0.06 mm)—was subjected to press-working such that a nonporous section α and porous sections β and γ were formed and such that a plurality of pores 11a of predetermined diameter were arranged in a predetermined layout, thus producing punching metal. The punching metal was cut to a predetermined size (e.g., a width of 15 mm and a length of 80 mm), thus forming a joint negative electrode plate core 11. In the joint negative electrode plate core 11, the nonporous section α acts as a joint section for connecting two negative electrode plates 10, 10 when the joint negative electrode plate cores 11 is later formed into a group of electrode plates. The porous section β opposes a positive electrode plate 20, and the porous section γ is to situated at the outermost position of a group of electrode plates and brought into contact with an interior side surface of the casing can.

A joint negative electrode plate core 11 was formed such that the pore ratio of the porous section β assumes 50% (i.e., the ratio of total areas of all pores 11a formed in the section β to the total surface area of the section β) and such that the pore ratio of the porous section γ assumes 40% (i.e., the ratio of total areas of all pores 11a formed in the section γ to the total surface area of the section γ). The thus-formed negative electrode plate core 11 was taken as a negative electrode plate core "a" in Example 1. Further, another joint negative electrode plate core 11 was formed such that the pore ratio of the porous section β assumes 50% and such that the pore ratio of the porous section γ assumes 30%. The thus-formed negative electrode plate core 11 was taken as a negative electrode plate core "b" in Example 2. Moreover, still another joint negative electrode plate core 11 was formed such that the pore ratio of the porous section β assumes 50% and such that the pore ratio of the porous section γ assumes 20%. The thus-formed negative electrode plate core 11 was taken as a negative electrode plate core "c" in Example 3. In addition, yet another joint negative electrode plate core 11 was formed such that the pore ratio of the porous section β assumes 50% and such that the pore ratio of the porous section γ assumes 10%. The thus-formed negative electrode plate core 11 was taken as a negative electrode plate core "d" in Example 4.

(2) EXAMPLE 5

Figure 1B:
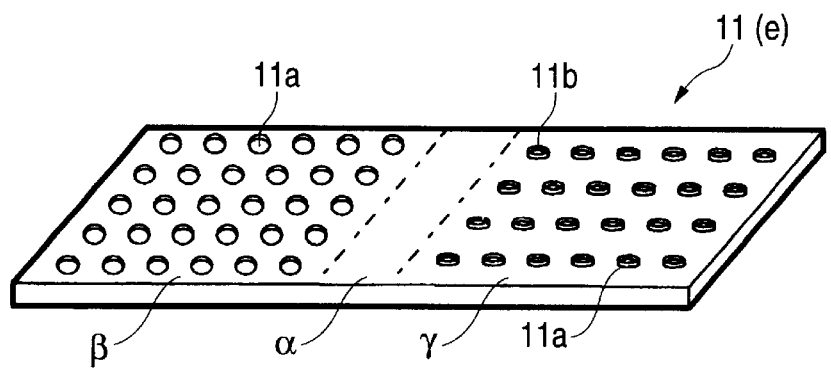

As shown in FIG. 1B, a metal electrode plate—which is formed from iron and electrode plated with nickel (to, e.g., a thickness of 0.05 to 0.06 mm)—was subjected to press-working such that a nonporous section α and porous sections β and γ were formed and such that a plurality of pores 11a of predetermined diameter are arranged in a predetermined layout, thus producing punching metal. The punching metal was cut to a predetermined size (e.g., a width of 15 mm and a length of 80 mm), thus forming a joint negative electrode plate core 11. In this case, pores 11a which are smaller than a predetermined diameter were formed beforehand through press-working. Brims of the pores 11a of small diameter were widened forcefully so as to constitute bumps 11b along the brims of respective pores 11a. A joint negative electrode plate core 11 was formed such that the pore ratio of the porous section β assumes 50% and such that the pore ratio of the porous section γ assumes 40%. The thus-formed joint negative electrode plate core was taken as a negative electrode plate core "e" in Example 5.

(3) EXAMPLES 6 THROUGH 9

In the same manner as in Examples 1 through 4, the joint negative electrode plate core 11 was manufactured. Here, a joint negative electrode plate core 11 was formed such that the pore ratio of the porous section β assumes 42% and such that the pore ratio of the porous section γ assumes 40%. The thus-formed joint negative electrode plate core was taken as a negative electrode plate core "f" in Example 6. Moreover, another joint negative electrode plate core 11 was formed such that the pore ratio of the porous section β assumes 42% and such that the pore ratio of the porous section γ assumes 30%. The thus-formed joint negative electrode plate core was taken as a negative electrode plate core "g" in Example 7. In addition, yet another joint negative electrode plate core 11 was formed such that the pore ratio of the porous section β assumes 42% and such that the pore ratio of the porous section γ assumes 20%. The thus-formed joint negative electrode plate core was taken as a negative electrode plate core "h" in Example 8. Still another joint negative electrode plate core 11 was formed such that the pore ratio of the porous section β assumes 42% and such that the pore ratio of the porous section γ assumes 10%. The thus-formed joint negative electrode plate core was taken as a negative electrode plate core "i" in Example 9.

(4) EXAMPLE 10

In the same manner as in Example 5, the joint negative electrode plate core 11 was manufactured. Here, a joint negative electrode plate core 11 was formed such that the pore ratio of the porous section β assumes 52% and such that the pore ratio of the porous section γ assumes 40%. The thus-formed joint negative electrode plate core was taken as a negative electrode plate core "j" in Example 10.

(5) EXAMPLE 11 THROUGH 14

In the same manner as in Examples 1 through 4, the joint negative electrode plate core 11 was manufactured. Here, a joint negative electrode plate core 11 was formed such that the pore ratio of the porous section β assumes 45% and such that the pore ratio of the porous section γ assumes 40%. The thus-formed joint negative electrode plate core was taken as a negative electrode plate core "k" in Example 11. Moreover, another joint negative electrode plate core 11 was formed such that the pore ratio of the porous section β assumes 45% and such that the pore ratio of the porous section γ assumes 30%. The thus-formed joint negative electrode plate core was taken as a negative electrode plate core "l" in Example 12. In addition, yet another joint negative electrode plate core 11 was formed such that the pore ratio of the porous section β assumes 45% and such that the pore ratio of the porous section γ assumes 20%. The thus-formed joint negative electrode plate core was taken as a negative electrode plate core "m" in Example 13. Still another joint negative electrode plate core 11 was formed such that the pore ratio of the porous section β assumes 45% and such that the pore ratio of the porous section γ assumes 10%. The thus-formed joint negative electrode plate core was taken as a negative electrode plate core "n" in Example 11.

(6) EXAMPLE 15

In the same manner as in Example 5, the joint negative electrode plate core 11 was manufactured. Here, a joint negative electrode plate core 11 was formed such that the pore ratio of the porous section β assumes 45% and such that the pore ratio of the porous section γ assumes 40%. The thus-formed joint negative electrode plate core was taken as a negative electrode plate core "o" in Example 15.

(7) COMPARATIVE EXAMPLE 1

Figure 1C:
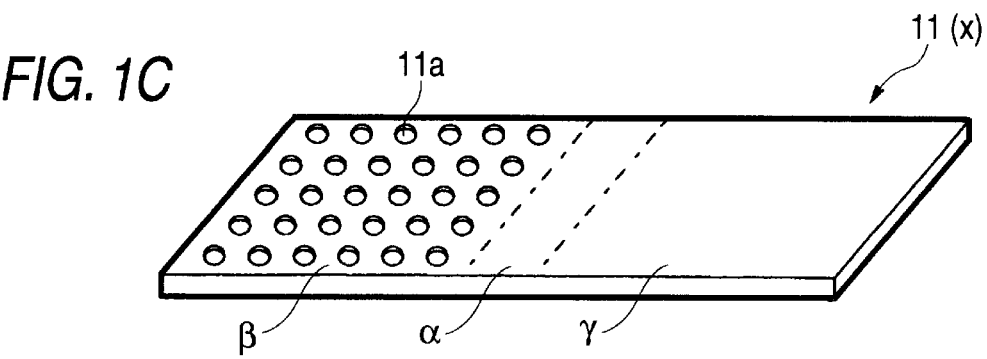

As shown in FIG. 1C, a metal electrode plate—which is formed from iron and electrode plated with nickel (e.g., a thickness of 0.05 to 0.06 mm)—was subjected to press-working such that nonporous sections α and γ and a porous section β were formed and such that a plurality of pores 11a of predetermined diameter are arranged in a predetermined layout, thus producing punching metal. The punching metal was cut to a predetermined size (e.g., a width of 15 mm and a length of 80 mm), thus forming a joint negative electrode plate core 11. In this case, the joint negative electrode plate core 11 was subjected to press-working such that the pore ratio of the porous section β assumes 50%. The thus-formed joint negative electrode plate core was taken as a negative electrode plate core "x" in Comparative Example 1.

(8) COMPARATIVE EXAMPLE 2

Figure 1D:
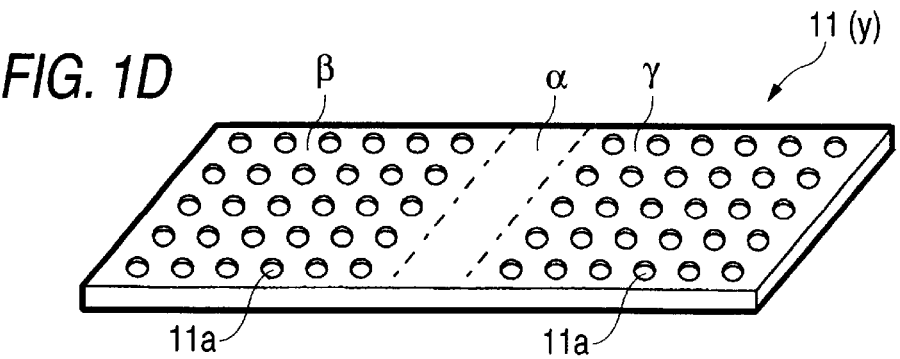

As shown in FIG. 1D, a metal electrode plate—which is formed from iron and electrode plated with nickel (to, e.g., a thickness of 0.05 to 0.06 mm)—as subjected to press-working such that a nonporous section α and porous sections β and γ were formed and such that a plurality of pores 11a of predetermined diameter are arranged in a predetermined layout, thus producing punching metal. The punching metal was cut to a predetermined size (e.g., a width of 15 mm and a length of 80 mm), thus forming a joint negative electrode plate core 11. In this case, the joint negative electrode plate core 11 was formed such that the pore ratio of the porous section β assumes 50% and such that the pore ratio of the porous section γ assumes 50%. The thus-formed joint negative electrode plate core was taken as a negative electrode plate core "o" in Comparative Example 2.

(9) COMPARATIVE EXAMPLE 3

In the same manner as in Comparative Example 1, the joint negative electrode plate core 11 was manufactured. Here, a joint negative electrode plate core 11 was formed through press-working such that the pore ratio of the porous section β assumes 42%. The thus-formed joint negative electrode plate core was taken as a negative electrode plate core "xa" in Comparative Example 3.

(10) COMPARATIVE EXAMPLE 4

In the same manner as in Comparative Example 2, the joint negative electrode plate core 11 was manufactured. The joint negative electrode plate core 11 was formed such that the pore ratio of the porous section β assumes 45% and such that the pore ratio of the porous section γ assumes 45%. The thus-formed joint negative electrode plate core was taken as a negative electrode plate core "ya" in Comparative Example 4.

thus-formed joint negative electrode plate core was taken as a negative electrode plate core "yb" in Comparative Example 6.

2. Manufacture of a Joint Negative Electrode Plate

A hydrogen absorbing alloy was kneaded with 5 mass percentage PTFE (polytetrafluoroethylene) serving as a binder, whereby a negative active material paste 12 was produced. Subsequently, the negative active material paste 12 was applied to either side of each of the joint negative electrode plate cores 11 (a, b, c, d, e, f, g, h, i, j, k, l, m, n, o, x, y, xa, ya, xb, and yb) manufactured in the manner mentioned previously. The joint negative electrode plate cores 11 were dried, and the negative active material paste 12 was removed from both sides of each of the sections α, as well as from one of the sides of each of the sections γ, thus forming the joint negative electrode plates 10. Here, when the joint negative electrode plate 10 was formed through use of the core "e," the negative active material paste 12 was removed from the surface on which no bumps 11b are formed at the time of removal of the negative active material paste 12 from one side of the section γ.

TABLE 1

| KIND OF NEGATIVE ELECTRODE PLATE | PORE RATIO OF SECTION β (%) | PORE RATIO OF SECTION γ (%) | BUMP PRESENT ALONG BRIM OF BORE | MEAN NUMBER OF PORES FROM WHICH THE PASTE HAS BEEN EXFOLIATED |
|---|---|---|---|---|
| A | 50 | 40 | None | 8 |
| B | 50 | 30 | None | 7 |
| C | 50 | 20 | None | 5 |
| D | 50 | 10 | None | 4 |
| E | 50 | 40 | Found | 3 |
| F | 42 | 40 | None | 10 |
| G | 42 | 30 | None | 8 |
| H | 42 | 20 | None | 7 |
| I | 42 | 10 | None | 5 |
| J | 42 | 40 | Found | 4 |
| K | 45 | 40 | None | 8 |
| L | 45 | 30 | None | 7 |
| M | 45 | 20 | None | 5 |
| N | 45 | 10 | None | 4 |
| O | 45 | 40 | Found | 3 |
| X | 50 | 0 | None | 1 |
| Y | 50 | 50 | None | 20 |
| Xa | 42 | 0 | None | 1 |
| Ya | 42 | 50 | None | 25 |
| Xb | 45 | 0 | None | 1 |
| Yb | 45 | 50 | None | 23 |

(11) COMPARATIVE EXAMPLE 5

In the same manner as in Comparative Example 1, the joint negative electrode plate core 11 was manufactured. Here, a joint negative electrode plate core 11 was formed through press-working such that the pore ratio of the porous section β assumes 45%. The thus-formed joint negative electrode plate core was taken as a negative electrode plate core "xb" in Comparative Example 5.

(12) COMPARATIVE EXAMPLE 6

In the same manner as in Comparative Example 2, the joint negative electrode plate core 11 was manufactured. The joint negative electrode plate core 11 was formed such that the pore ratio of the porous section β assumes 45% and such that the pore ratio of the porous section γ assumes 45%. The 3. Measurement of Strength of a Negative Electrode Plate Disposed at the outermost position of a group of electrode plates Next, only the sections γ were cut from the joint negative electrode plates 10 manufactured in the manner mentioned previously, thus forming sample negative electrode plates 10a. The binding strengths of the sample negative electrode plates 10a were determined. Here, as shown in FIG. 2, at the time of measurement of binding strengths, the surfaces of the negative active material layers 12 of the respective sample negative electrode plates 10a (here the negative active material layer 12 is formed on one side of each of the negative electrode plate cores 11 of the sample negative electrode plates 10a) were machined. Then, the thus-machined surfaces of the negative active material layers 12 were lightly scrubbed with textile waste, thereby removing cuttings. A cutter knife (not shown) was retained so as to make an angle of about 30° with respect to the surfaces of the respective negative active material layers 12. Notched groves x, y were formed so as to cut each of the negative active material layers 12 such that a load of about 250 g is imposed on the edge of the cutter knife. Here, the grooves x, y were spaced 1 mm apart from each other. Ten notched grooves "x" and ten notched grooves "y" were drawn so as to cross each other at right angles.

Ten notched grooves "x" and ten notched grooves "y" were drawn so as to cross each other at right angles, thereby forming 100 squares in a matrix pattern. Ten sample negative electrode plates 10a, each having 100 squares formed thereon, were lifted to a height of about 100 mm and dropped from the height through free fall. This drop test was conducted three times repeatedly. Then, the number of squares dropped from the respective sample negative electrode plates 10a was counted, thereby determining a mean number of dropped squares. Results of the tests are as shown in Table 2.

TABLE 2

| KIND OF NEGATIVE ELECTRODE PLATE | PORE RATIO OF SECTION γ (%) | BUMP PRESENT ALONG BRIM OF PORE | MEAN NUMBER OF SQUARES DROPPED |
|---|---|---|---|
| a | 40 | None | 8 |
| b | 30 | None | 7 |
| c | 20 | None | 5 |
| d | 10 | None | 4 |
| e | 40 | Found | 3 |
| x | 0 | None | 1 |
| y | 50 | None | 20 |

As is evident from the results provided in Table 2, a mean number of squares that dropped from the sample negative electrode plates "y" in which the porous section γ has a pore ratio of 50% is 20. In contrast, as the pore ratio of the porous section γ decreases, the mean number of dropped squares falls considerably, to 8 7, 5, 4, 3, and 1. This is considered to be ascribable to the binding strength between the active material layer 12 and the electrode plate core 11 increasing with a decrease in the pore ratio of the porous section γ, thereby inhibiting drop of the active material layer 12. For these reasons, one can safely say that the pore ratio of the porous section γ; that is, the pore ratios of the respective electrode plate cores 11 which are disposed at the outermost positions and whose negative electrode plate cores are exposed, is preferably set to a value of 40% or less. The same also applies to a case where the pore ratio of the porous section β assumes 42% and a case where the pore ratio of the porous section β assumes 45%.

When the mean number of squares dropped from the sample negative electrode plate "a" for which the pore ratio of the porous section γ has been set to 40% is compared with the mean number of squares dropped from the sample negative electrode plate "e" for which the pore ratio of the porous section γ has been set to 40%, the mean number of squares dropped from the sample negative electrode plate "e" is understood to be smaller. The reason for this is that, since the bumps 10b are formed on one side of the porous section γ of the sample negative electrode plate "e," the active material layer 12 applied to this side adheres to the negative electrode plate core so as to enter into the bumps 10b. The same also applies to a case where the pore ratio of the porous section β assumes 42% and a case where the pore ratio of the porous section β assumes 45%.

4. Manufacture of a Positive Electrode Plate

A metal porous member 21, which is made of nickel foam and has a three-dimensionally continuous space, is filled with active material slurry composed of predominantly nickel hydroxide. After having dried, the metal porous member 21 is rolled to a predetermined thickness, thus producing a nickel positive electrode plate 20. A peeled section is formed at an upper end of the nickel positive electrode plate 20 by means of removing a portion of the filled active material. Subsequently, a current-collecting lead electrode plate 21a is fixed to the peeled section by means of welding. Here, the active material slurry composed of predominantly nickel hydroxide is embodied, by means of mixing 10 parts by mass nickel hydroxide powder—which contains 2.5 mass percent zinc and 1 mass percent cobalt as a coprecipitation component—with 3 parts by mass zinc oxide powder, thus producing a mixed powder; adding an aqueous solution of 0.2 mass percent hydroxypropyl cellulose to the mixed powder; and agitating and mixing the mixed powder.

5. Manufacture of a Group of Electrode Plates

First, long nonwoven fabric cloth—of predetermined thickness and made of polypropylene—is folded into two, and the two ends of the fabric cloth are fastened together, thus producing a bag-shaped separator 30. The nickel positive electrode plate 20 manufactured in the above-described manner is housed in the separator 30. Then, the center of each of the joint negative electrode plates 10 (i.e., the nonporous section α of each of the negative electrode plate cores 11; that is, joint sections) manufactured in the previously described manner is folded into a U-shaped form. The separator 30 having the nickel positive electrode plate 20 housed therein is sandwiched between the joint negative electrode plates 10, 10 folded into a U-shaped form, thus constituting a set of electrode plates. Two electrode plate sets are prepared. The separator 30 having the nickel positive electrode plate 20 housed therein is interposed between the two sets of electrode plates in a stacked manner, thus producing groups of electrode plates a1, b1, c1, d1, e1, f1, g1, h1, i1, j1, k1, l1, m1, n1, o1, x1, y1, xa1, ya1, xb1, and yb1.

More specifically, a group of electrode plates using negative electrode plate cores "a" (in which pore ratio of the porous section γ assumes 40%) are taken as a group of electrode plates a1. A group of electrode plates using negative electrode plate cores "b" (in which pore ratio of the porous section γ assumes 30%) are taken as a group of electrode plates b1. A group of electrode plates using negative electrode plate cores "c" (in which pore ratio of the porous section γ assumes 20%) are taken as a group of electrode plates c1. A group of electrode plates using negative electrode plate cores "d" (in which pore ratio of the porous section γ assumes 10%) are taken as a group of electrode plates d1. A group of electrode plates using negative electrode plate cores "e" (in which pore ratio of the porous section γ assumes 40%, and bumps 11b are formed along brims of pores) are taken as a group of electrode plates e1. A group of electrode plates using negative electrode plate cores "x" (no pores are formed in the section γ) are taken as a group of electrode plates x1. A group of electrode plates using negative electrode plate cores "y" (in which pore ratio of the porous section γ assumes 50%) are taken as a group of electrode plates y1.

Moreover, a group of electrode plates using negative electrode plate cores "f" (in which pore ratio of the porous section γ assumes 40%) are taken as a group of electrode plates f1. A group of electrode plates using negative electrode plate cores "g" (in which pore ratio of the porous section γ assumes 30%) are taken as a group of electrode plates g1. A group of electrode plates using negative electrode plate cores "h" (in which pore ratio of the porous section γ assumes 20%) are taken as a group of electrode plates h1. A group of electrode plates using negative electrode plate cores "i" (in which pore ratio of the porous section γ assumes 10%) are taken as a group of electrode plates i1. A group of electrode plates using negative electrode plate cores "j" (in which pore ratio of the porous section γ assumes 40%, and bumps 11b are formed along brims of pores) are taken as a group of electrode plates j1. A group of electrode plates using negative electrode plate cores xa (no pores are formed in the section γ) are taken as a group of electrode plates xa1. A group of electrode plates using negative electrode plate cores ya (in which pore ratio of the porous section γ assumes 50%) are taken as a group of electrode plates ya1.

Furthermore, a group of electrode plates using negative electrode plate cores "k" (in which pore ratio of the porous section γ assumes 40%) are taken as a group of electrode plates k1. A group of electrode plates using negative electrode plate cores "l" (in which pore ratio of the porous section γ assumes 30%) are taken as a group of electrode plates l1. A group of electrode plates using negative electrode plate cores "m" (in which pore ratio of the porous section γ assumes 20%) are taken as a group of electrode plates m1. A group of electrode plates using negative electrode plate cores "n" (in which pore ratio of the porous section γ assumes 10%) are taken as a group of electrode plates n1. A group of electrode plates using negative electrode plate cores "o" (in which pore ratio of the porous section γ assumes 40%, and bumps 11b are formed along brims of pores) are taken as a group of electrode plates o1. A group of electrode plates using negative electrode plate cores xb (no pores are formed in the section γ) are taken as a group of electrode plates xb1. A group of electrode plates using negative electrode plate cores yb (in which pore ratio of the porous section γ assumes 50%) are taken as a group of electrode plates yb1.

6. Manufacture of a Rectangular Nickel-Hydrogen Storage Battery

The thus-produced groups of electrode plates a1, b1, c1, d1, e1, f1, g1, h1, i1, j1, k1, l1, m1, n1, o1, x1, y1, xa1, ya1, xb1, and yb1 are inserted into respective unpenetrating metal casing cans 40 of square columnar (rectangular) shape. In each group of electrode plates, the surfaces of the joint negative electrode plates 10 disposed at the outermost positions, the negative electrode plate cores 11 being exposed from the surfaces, are brought into intimate contact with the interior surfaces of the metal casing can 40. Further, the joint sections α of the negative electrode plate cores 11 are brought into intimate contact with the inner bottom surface of the metal casing can 40. Subsequently, the current-collecting lead electrode plate 21a is provided on top of the nickel positive electrode plate 20 of each electrode plate group, and the current-collecting lead electrode plates 21a extending from the tops of the nickel positive electrode plates 20 are welded to a lower surface of a positive terminal 42 of a sealing electrode plate 41.

An insulator 43 is provided around the positive terminal 42, thereby electrically insulating the sealing electrode plate 41 from the positive terminal 42. An electrolyte composed of 30 mass percent potassium hydroxide (KOH) is poured into each of the metal casing cans 40. A joint existing between the sealing electrode plate 41 and each of the metal casing cans 40 is irradiated with a laser beam, thereby becoming hermetically sealed. As a result, there are manufactured rectangular nickel-hydrogen storage batteries A, B, C, D, E, F, G, H, I, J, K, L, M, N, O, X, Y, XA, YA, XB, and YB, each of B1 size (a width of 17.0 mm, a height of 48.0 mm, and a thickness of 6.1 mm) and a nominal capacity of 880 mAh.

More specifically, a rectangular nickel-hydrogen storage battery comprising a group of electrode plates a1 using the negative electrode plate cores "a" (in which pore ratio of the porous section γ assumes 40%) is taken as battery A. A rectangular nickel-hydrogen storage battery comprising a group of electrode plates b1 using the negative electrode plate cores "b" (in which pore ratio of the porous section γ assumes 30%) is taken as battery B. A rectangular nickel-hydrogen storage battery comprising a group of electrode plates c1 using the negative electrode plate cores "c" (in which pore ratio of the porous section γ assumes 20%) is taken as battery C. A rectangular nickel-hydrogen storage battery comprising a group of electrode plates d1 using the negative electrode plate cores "d" (in which pore ratio of the porous section γ assumes 10%) is taken as battery D. A rectangular nickel-hydrogen storage battery comprising a group of electrode plates e1 using the negative electrode plate cores "e" (in which pore ratio of the porous section γ assumes 40%, and bumps 11b are formed along brims of pores) is taken as battery E. A rectangular nickel-hydrogen storage battery comprising a group of electrode plates x1 using negative electrode plate cores "x" (no pores are formed in the section γ) is taken as battery X. A rectangular nickel-hydrogen storage battery comprising a group of electrode plates y1 using negative electrode plate cores "y" (in which pore ratio of the porous section γ assumes 50%) is taken as battery Y.

Moreover, a rectangular nickel-hydrogen storage battery comprising a group of electrode plates f1 using the negative electrode plate cores "f" (in which pore ratio of the porous section γ assumes 40%) is taken as battery F. A rectangular nickel-hydrogen storage battery comprising a group of electrode plates g1 using the negative electrode plate cores "g" (in which pore ratio of the porous section γ assumes 30%) is taken as battery G. A rectangular nickel-hydrogen storage battery comprising a group of electrode plates h1 using the negative electrode plate cores "h" (in which pore ratio of the porous section γ assumes 20%) is taken as battery H. A rectangular nickel-hydrogen storage battery comprising a group of electrode plates i1 using the negative electrode plate cores "i" (in which pore ratio of the porous section γ assumes 10%) is taken as battery I. A rectangular nickel-hydrogen storage battery comprising a group of electrode plates j1 using the negative electrode plate cores "j" (in which pore ratio of the porous section γ assumes 40%, and bumps 11b are formed along brims of pores) is taken as battery J. A rectangular nickel-hydrogen storage battery comprising a group of electrode plates xa1 using negative electrode plate cores xa (no pores are formed in the section γ) are taken as battery XA. A rectangular nickel-hydrogen storage battery comprising a group of electrode plates ya1 using negative electrode plate cores ya (in which pore ratio of the porous section γ assumes 50%) is taken as battery Y.

In addition, a rectangular nickel-hydrogen storage battery comprising a group of electrode plates k1 using the negative electrode plate cores "k" (in which pore ratio of the porous section γ assumes 40%) is taken as battery K. A rectangular nickel-hydrogen storage battery comprising a group of electrode plates l1 using the negative electrode plate cores "l" (in which pore ratio of the porous section γ assumes 30%) is taken as battery L. A rectangular nickel-hydrogen storage battery comprising a group of electrode plates m1 using the negative electrode plate cores "m" (in which pore ratio of the porous section γ assumes 20%) is taken as battery M. A rectangular nickel-hydrogen storage battery comprising a group of electrode plates n1 using the negative electrode plate cores "n" (in which pore ratio of the porous section γ assumes 10%) is taken as battery N. A rectangular nickel-hydrogen storage battery comprising a group of electrode plates o1 using the negative electrode plate cores "o" (in which pore ratio of the porous section γ assumes 40%, and bumps 11b are formed along brims of pores) is taken as battery O. A rectangular nickel-hydrogen storage battery comprising a group of electrode plates xb1 using negative electrode plate cores xb (no pores are formed in the section γ) is taken as battery XB. A rectangular nickel-hydrogen storage battery comprising a group of electrode plates yb1 using negative electrode plate cores yb (in which pore ratio of the porous section γ assumes 50%) is taken as battery YB.

7. Cycle Characteristic Test

The thus-manufactured storage batteries A, B, C, D, E, F, G, H, I, J, K, L, M, N, O, X, Y, XA, YA, XB, and YB are recharged with a charging current 1It (880 mA). Recharging of the batteries is halted when the battery voltage has dropped by 10 mV after having exceeded a peak voltage (−ΔV method). After recharging of the batteries has been halted for one hour, the batteries discharge a discharge current 1It (880 mA) until the battery voltage reaches 1.0 V. Subsequently, discharging of the batteries is halted for one hour. These operations are taken as one recharge/discharge cycle, and the batteries are subjected to the recharge/discharge cycle repeatedly. A ratio of service capacity of a battery obtained after the battery has undergone 500 cycles to service capacity of the battery obtained after the battery has undergone one cycle is determined as a service capacity ratio (capacity ratio). Results such as those provided in Table 3 are obtained.

TABLE 3

| KIND OF BATTERY | PORE RATIO OF SECTION β (%) | PORE RATIO OF SECTION γ (%) | BUMP PRESENT ALONG BRIM OF PORE | CAPACITY RATIO |
|---|---|---|---|---|
| A | 50 | 40 | NONE | 85 |
| B | 50 | 30 | NONE | 83 |
| C | 50 | 20 | NONE | 81 |
| D | 50 | 10 | NONE | 80 |
| E | 50 | 40 | FOUND | 85 |
| F | 42 | 40 | NONE | 86 |
| G | 42 | 30 | NONE | 84 |
| H | 42 | 20 | NONE | 83 |
| I | 42 | 10 | NONE | 82 |
| J | 42 | 40 | FOUND | 81 |
| K | 45 | 40 | NONE | 87 |
| L | 45 | 30 | NONE | 85 |
| M | 45 | 20 | NONE | 83 |
| N | 45 | 10 | NONE | 82 |
| O | 45 | 40 | FOUND | 87 |
| X | 50 | 0 | NONE | 60 |
| Y | 50 | 50 | NONE | 86 |
| XA | 42 | 0 | NONE | 60 |
| YA | 42 | 50 | NONE | 86 |
| XB | 45 | 0 | NONE | 60 |
| YB | 45 | 50 | NONE | 86 |

As is evident from the results provided in Table 3, batteries A, B, C, D, E, and Y, which use the negative electrode plate cores 11 including core exposed sections (i.e., the porous sections γ) having the pores 11a formed therein are greater in capacity than the battery X which uses the negative electrode plate core 11 including a nonporous core exposed section (i.e., the section γ) The greater the pore ratio of the core exposed section (i.e., the porous section γ), the greater the capacity ratio.

The reason for this is considered as follows. In the battery X, the core exposed section (i.e., the section γ) has no pores. Hence, the permeability of the battery X for the gas developing therein has decreased relative to the batteries A, B, C, D, E, and Y. In association with progress in the recharging/discharge cycle, the internal pressure of the battery increases. In association with a rise in internal pressure, the electrolyte is discharged to the outside of the battery, resulting in a reduction in the capacity ratio of the battery.

The pore ratio of the negative electrode plate core 11 of the core exposed section (i.e., section γ) is decreased in sequence from batteries Y, E, A, B, C, and D, and the permeability of the battery for the gas evolving in the battery decreases with a decrease in the pore ratio. As a result, the capacity ratio also drops. If the pore ratio of the negative electrode plate core 11 of the core exposed section (i.e., the porous section γ) assumes 10% as in the case of battery D, no substantial drop in capacity ratio arises. Hence, one can say that the pore ratio of the negative electrode plate core 11 of the core exposed section (i.e., the porous section γ) should be specified as 10% or more.

The results provided in Tables 1 and 2 show that when the binding strength of the negative electrode plate is increased so long as the pore ratio of the negative electrode plate core 11 of the core exposed section (i.e., the section γ) is set in the range of 10% to 40%, exfoliation of active material can be inhibited. Therefore, there can be obtained an alkaline storage battery having superior permeability for gas, which would develop in a battery, and an improved capacity ratio.

As has been described, in the present invention, the negative cores of the negative electrode plates disposed at the outermost positions of the group of electrode plates are exposed. The pore ratios of the exposed electrode plate cores must be made lower than those of the other unexposed electrode plate cores. The pore ratio of the exposed negative electrode plate core is specified as falling within the range of 10% to 40%. As a result, the binding strengths of the negative electrode plates disposed at the outermost positions of the group of electrode plates are improved, thereby inhibiting exfoliation of active material. Further, there can be obtained a large rectangular alkaline storage battery which has superior permeability for a gas which would arise in the battery, an improved capacity ratio, and greater volumetric energy density.

The previous embodiment has described a case where the surfaces of the negative electrode plate cores 11 of the negative electrode plates 10, which are disposed at the outermost positions of the group of electrode plates and coated with active material, are not imparted with irregularities. However, the negative electrode plate cores of the negative electrode plates disposed at the outermost positions of the group of electrode plates maybe imparted with irregularities through sandblasting or knurling, thereby forming minute bumps on the surfaces of the negative electrode plates that are disposed at the outermost positions of the group of electrode plates and coated with active material, excluding pores formed therein. The minute bumps are buried in the layer of active material applied over the surface. Hence, the binding strength existing between the layers of active material on the electrode plates disposed at the outermost positions of the group of electrode plates and the electrode plate cores can be increased further.

In relation to the embodiment, there has been described a case where, when the pore ratio of the porous section γ of the joint negative electrode plate core 11 is made lower than the pore ratio of the porous section β of the same, the number of pores 11a formed in the porous section γ is decreased. Rather than decreasing the number of pores 11a formed in the porous section γ, the pores 11a formed in the porous section γ may be made smaller in diameter. Alternatively, the pores may adopt another geometry; for example, a square shape, an oval shape, or a trirectangular shape. Although the previous embodiment has described a case where the present invention is applied to a nickel-hydrogen storage battery, the same advantage is yielded even when the present invention is applied to another alkaline storage battery, such as a nickel-cadmium storage battery.

What is claimed is:

1. A rectangular alkaline storage battery comprising:
   a group of electrode plates in which positive electrode plates formed from electrode plate cores coated with positive active material and negative electrode plates formed from electrode plates cores coated with negative active material are alternately stacked with separators sandwiched therebetween;
   a rectangular metal casing can hermetically sealing said group of electrode plates therein, wherein each of the electrode plate cores has a plurality of pores;

outer sides of electrode plate cores disposed at the outermost positions of the group of electrode plates are exposed; and the pore ratios of the electrode plate cores disposed at the outermost positions are 10 to 40%.

2. A rectangular alkaline storage battery according to claim 1, wherein bumps are formed along brims of pores formed in the electrode plate cores disposed at the outermost positions of the group of electrode plates; active material is applied over a surface having the bumps formed thereon; and the side of the surface opposite the side having the bumps formed thereon is exposed.

3. The rectangular alkaline storage battery according to claim 1, wherein minute bumps are formed on the surfaces of the electrode plate cores that are located at the outermost positions of the group of electrode plates and coated with the active material, excluding the pores formed therein.

4. The rectangular alkaline storage battery according to claim 1, wherein the exposed surfaces of the electrode plate cores located at the outermost positions of the group of electrode plates remain in contact with interior side surfaces of the rectangular metal casing can.

5. The rectangular alkaline storage battery according to claim 1, wherein the electrode plate core is formed from punching metal.

6. The rectangular alkaline storage battery according to claim 1, wherein a nonporous joint section is formed integrally with each of the electrode plate cores placed at the outermost positions of the group of electrode plates; and each joint section is bent into a substantially U-shaped form, and a electrode plate of the other polarity is held in a space which is defined in the substantially U-shaped form through bending, with separators sandwiched therebetween.

7. The rectangular alkaline storage battery according to claim 1, wherein the electrode plate cores located at the outermost positions of the group of electrode plates are negative electrode plate cores.

8. The rectangular alkaline storage battery according to claim 1, wherein pore ratios of the electrode plate cores disposed at the outermost positions are lower than pore ratios of electrode plate cores disposed inside of the outermost positions.

* * * * *